(12) United States Patent
Hunt et al.

(10) Patent No.: US 11,807,580 B2
(45) Date of Patent: Nov. 7, 2023

(54) HIGH STRENGTH CERAMICS WITH NOVEL FRACTURE MODE

(71) Applicant: The Government of the United States of America, as represented by the Secretary of the Navy, Arlington, VA (US)

(72) Inventors: Michael Hunt, Alexandria, VA (US); Guillermo R. Villalobos, Springfield, VA (US); Benjamin Rock, Rockville, MD (US); Shyam S. Bayya, Ashburn, VA (US); Woohong Kim, Washington, DC (US); Ishwar D. Aggarwal, Waxhaw, NC (US); Bryan Sadowski, Falls Church, VA (US); Jasbinder S. Sanghera, Ashburn, VA (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 0 days.

(21) Appl. No.: 17/716,085

(22) Filed: Apr. 8, 2022

(65) Prior Publication Data

US 2022/0227675 A1    Jul. 21, 2022

Related U.S. Application Data

(62) Division of application No. 15/498,709, filed on Apr. 27, 2017, now Pat. No. 11,299,428.

(Continued)

(51) Int. Cl.
*C04B 35/505*    (2006.01)
*C04B 35/443*    (2006.01)
(Continued)

(52) U.S. Cl.
CPC .......... *C04B 35/505* (2013.01); *C04B 35/443* (2013.01); *C04B 35/4682* (2013.01);
(Continued)

(58) Field of Classification Search
None
See application file for complete search history.

(56) References Cited

U.S. PATENT DOCUMENTS

| | | | |
|---|---|---|---|
| 7,022,198 B2 * | 4/2006 | Bruce | C04B 35/64 |
| | | | 156/89.11 |
| 9,238,773 B2 * | 1/2016 | Seeley | C04B 35/50 |
| 11,299,428 B2 * | 4/2022 | Hunt | C04B 35/443 |

FOREIGN PATENT DOCUMENTS

PL    437956 A1 *    11/2022

OTHER PUBLICATIONS

Seeley, Zachary M., et al. "Transparent Lu2O3:Eu Ceramics by Sinter and HIP Optimization." Optical Materials, vol. 33, No. 11, Elsevier BV, Sep. 2011, pp. 1721-1726. https://doi.org/10.1016/j.optmat.2011.05.031. (Year: 2011).*

(Continued)

*Primary Examiner* — Alison L Hindenlang
*Assistant Examiner* — Andrés E. Behrens, Jr.
(74) *Attorney, Agent, or Firm* — US Naval Research Laboratory; Rebecca Forman

(57) ABSTRACT

The present invention provides a method for making a high strength, small grain size ceramic having a transgranular fracture mode by rapid densification of a green body and subsequent cooling of the densified ceramic. The ceramic may include dislocations, defects, dopants, and/or secondary phases that are formed as a result of the process and resulting in stress fields capable of redirecting or arresting cracks within the material. This ceramic can maintain transparency from ultraviolet to mid-wave infrared.

5 Claims, 6 Drawing Sheets

Related U.S. Application Data

(60) Provisional application No. 62/328,319, filed on Apr. 27, 2016.

(51) Int. Cl.
*C04B 35/50* (2006.01)
*C04B 35/46* (2006.01)
*C04B 35/64* (2006.01)
*C04B 35/638* (2006.01)
*C04B 35/468* (2006.01)

(52) U.S. Cl.
CPC ............ *C04B 35/50* (2013.01); *C04B 35/638* (2013.01); *C04B 35/64* (2013.01); *C04B 2235/3208* (2013.01); *C04B 2235/3215* (2013.01); *C04B 2235/3222* (2013.01); *C04B 2235/3224* (2013.01); *C04B 2235/3225* (2013.01); *C04B 2235/3236* (2013.01); *C04B 2235/5409* (2013.01); *C04B 2235/5445* (2013.01); *C04B 2235/604* (2013.01); *C04B 2235/608* (2013.01); *C04B 2235/6025* (2013.01); *C04B 2235/6027* (2013.01); *C04B 2235/6562* (2013.01); *C04B 2235/6567* (2013.01); *C04B 2235/667* (2013.01); *C04B 2235/77* (2013.01); *C04B 2235/786* (2013.01)

(56) References Cited

OTHER PUBLICATIONS

An, Liqiong, et al. "Two-step Pressure Sintering of Transparent Lutetium Oxide by Spark Plasma Sintering." Journal of the European Ceramic Society, vol. 31, No. 9, Elsevier BV, Aug. 2011, pp. 1597-1602. https://doi.org/10.1016/j.jeurceramsoc.2011.03.014. (Year: 2011).*

An, Liqiong, et al. "Highly Transparent Lutetium Titanium Oxide Produced by Spark Plasma Sintering." Journal of the European Ceramic Society, vol. 31, No. 1-2, Jan. 2011, pp. 237-240. https://doi.org/10.1016/j.jeurceramsoc.2010.09.010. (Year: 2011).*

PL-437956-A1 (KRUK) Nov. 2022 (online machine translation), [Retrieved on Jun. 5, 2023], Retrieved from: Google Patents (Year: 2022).*

* cited by examiner

HIGH STRENGTH CERAMICS WITH NOVEL FRACTURE MODE

PRIORITY CLAIM

The present application is a divisional application of U.S. application Ser. No. 15/498,709, filed on Apr. 27, 2017 by Michael Hunt et al., entitled "HIGH STRENGTH CERAMICS WITH NOVEL FRACTURE MODE," which was a non-provisional application claiming the benefit of U.S. Provisional Application No. 62/328,319, filed on Apr. 27, 2016 by Michael Hunt et al., entitled "HIGH STRENGTH CERAMICS WITH NOVEL FRACTURE MODE." These applications and all other publications and patent documents referred to throughout this nonprovisional application are incorporated herein by reference in their entirety.

BACKGROUND OF THE INVENTION

Field of the Invention

The present invention relates to ceramics with a high strength fracture mode.

Description of the Prior Art

Relevance to Materials

There is a need for transparent, lightweight, high strength, high hardness materials with ultraviolet (UV) to midwave infrared (MWIR) transmission. The material must be producible by an economically feasible process that is compatible with large and/or complex geometries for use as transparent structural components and/or in armor applications. Previously developed materials and fabrication processes fail to demonstrate all the required properties to the necessary degree. For example, boron carbide is light, strong, and hard but is opaque. Glass is transparent but is weak. Traditional composites (such as fiber-reinforced polymers) are light and strong but cannot transmit at the necessary wavelengths.

Magnesium aluminate spinel (hereafter, spinel), sapphire and aluminum oxynitride (ALON) are optical materials that are currently used as windows for sensors in the 0.4-5.0 µm wavelength region. Among the three, spinel has the best transmission in the 4-5 microns wavelength region, while ALON is the worst. All 3 materials transmit from UV to 4 µm; however, high transmission in the 4-5 µm region is critical to several sensing and imaging applications. In addition, sapphire is birefringent meaning that its optical properties are anisotropic. As a result, sapphire windows with any curved geometric elements are of limited utility. Spinel in small sizes has been demonstrated to have high strength, hardness, and transmission in the desired range (Villalobos et al., J. Mater. Res., 29, 2266 (2014) and Bayya et al., Proc. of SPIE, 8837, OV-1 (2013)).

Traditional methods of making polycrystalline spinel rely on pressured or vacuum sintering techniques using resistive heating elements. The heat is generated at the heating element and transferred to the spinel compact from the outside in, either through convective flow or infrared radiation. This results in temperature gradients through the material that require much longer sintering time to achieve uniform density and causes extensive grain growth leading to severe degradation in the material properties for large sizes and/or complex geometries of spinel. The use of sintering aids, as is often necessary in these methods, to reduce activation energy for sintering or to remove impurities from powder surfaces during sintering further weakens the material's mechanical properties. (Rozenburg et al., J. Am. Ceram. Soc., 91, 444 (2008) and Mroz et al, Int. J. Appl. Cerma. Tec., 9, 83, (2011)). In addition, complex geometries present difficulties for processes that involve uniaxial pressure, e.g. hot pressing, because of the geometrically required pressure gradients. The strength of spinel produced by using pressured or vacuum sintering techniques is halved when produced in large sizes and complex shapes. (Sepulveda et al., Proc. of SPIE, 8016, 801604-1 (2011)).

Other optical ceramic laser host materials such as $Y_2O_3$, $Lu_2O_3$, yttrium aluminum garnet (YAG) or non-optical ceramics such as zirconia (used in dental implants) and alumina (used as a substrate in microelectronics) need to be fabricated using methods that maintain high strength in the finished product.

Microwave Processing of Ceramic Materials

The use of microwave radiation to heat and densify powdered ceramic compacts has been demonstrated to result in short processing times due to direct volumetric heating. (Cheng et al., Ceram. Bull., 79, 71 (2000); Gilde et al, Proc. of SPIE, 3705, 94 (1999); and Agrawal, Curr. Opin. Solid St. M., 3, 480 (1998)). The focus of the majority of microwave sintering work has been done at microwave frequencies from 0.9-5.8 GHz which is within the lower radio spectrum that has been designated for Industrial, Scientific, and Medical (ISM) use. Since most ceramics do not absorb these low frequency microwaves well at room temperature, the use of susceptors and thermal insulators is typically necessary. (Cheng et al., Ceram. Bull., 79, 71 (2000); Gilde et al, Proc. of SPIE, 3705, 94 (1999); Agrawal, Curr. Opin. Solid St. M., 3, 480 (1998); Cheng et al., Mater. Lett., 56, 587 (2002); Aguilar et al., J. Microwave Power EE, 32, 74 (1997); and Cheng et al., Am. Ceram. Soc. Bull., 79, 71 (2000)). A susceptor is a material that strongly absorbs microwaves of the specific frequency of interest and is used as the initial, or primary, heat source during the process. When a susceptor is used, it is because the material does not directly absorb the microwaves until an elevated temperature is reached, if at all. Because the material is relying on conventional heating from the susceptor to achieve the temperatures necessary for direct interaction with the microwaves, thermal and interaction gradients are created in the material during processing. Cycle times (heat up, soak, and cool down) are similarly longer than with direct microwave heating. As a result, materials processed in this way have comparable mechanical properties to those produced by traditional means. (Gilde et al, Proc. of SPIE, 3705, 94 (1999) and Agrawal, Curr. Opin. Solid St. M., 3, 480 (1998)).

The amount of microwave absorption at room temperature and the depth of microwave penetration for a given material both vary with frequency, but in inverse relation to each other. For most ceramics, microwave absorption is stronger at higher microwave frequencies, which eliminates the need for a susceptor. Extrapolation of the data from Afsar (Afsar, "Dielectric Measurements of Millimeter-Wave Materials," IEEE Trans MTT, 32, 12, (1984)) and Ho (Ho, "Millimeter-Wave Dielectric Property Measurement of Gyrotron Window Materials," Technical Report ORNL/SUB-83-519261/1 (April 1984)) shows that the loss tangent for coarse grained spinel increases about six-fold from 1 GHz to 100 GHz. In addition, the increase is even more pronounced for fine grained materials.

For optimal conversion of microwave energy into thermal energy within a powder compact, the thickness of the compact should be on the order of the half-power depth of the microwaves in the material. (Hutcheon, "What is the Best Microwave Absorber," Ceramic Transactions, Microwaves: Theory and Application in Materials Processing III, 59, 215 (1995)). For sintered spinel, the half power depth for W-band is several tens of centimeters at room temperature. (Afsar, "Dielectric Measurements of Millimeter-Wave Materials," IEEE Trans MTT, 32, 12, (1984)). For a spinel nanopowder compact, the penetration depth will be different in a way that is difficult to predict a priori (decreased density will push it upwards, whereas more surface area will pull it downwards); however, it is not likely to change by more than about an order of magnitude. At 1600° C., the typical sintering temperature for spinel, the half power depth will be reduced to centimeters. (Ho, "Millimeter-Wave Dielectric Property Measurement of Gyrotron Window Materials," Technical Report ORNL/SUB-83-519261/1 (April 1984)). Since initial necking and densification takes place rapidly in sintering (German, "Sintering Theory and Practice," Wiley (1996)), and in microwave sintering in particular (Ma et al., "Systematic study of microwave absorption, heating, and microstructure evolution of porous copper powder metal compacts," J. App. Phys., 101, 074906 (2007)), the high temperature half power depth of a ceramic powder compact will be very close to the depth for a fully dense material. Therefore, 83 GHz W-band microwaves are close to the ideal frequency for the energy transfer to spinel compacts over the entire temperature range in a sintering run.

For planar geometries, the microwaves may be propagated through the material in single pass free-space transmission mode for sintering. In this configuration, efficient and uniform sintering can be obtained by shaping the incident microwave beam to have a top hat distribution with uniform non-zero field only over the specimen. There will, however, be longitudinal standing waves induced in the specimen by the impedance mismatches at both the leading and trailing interfaces. A typical ceramic might have index of refraction of about 2-4, which reduces the microwave wavelength within the material by the same factor. For 3 GHz microwaves, this leads to a wavelength of 2-5 cm in the material. The standing waves create nodes and anti-nodes, and thus hot and cold spots, with separation on the order of 1 cm. At 83 GHz, the separation decreases to <2 mm. On these shorter distance scales, thermal smoothing is effective at evening the temperature distribution on millisecond timescales. (Gold et al., "Interference and Guiding Effects in Slabs and Joints with Millimeter Wave Radiation Heating of Ceramics," J. Mat. Synth. Proc., 9, 5, 287-297 (2001)). The required beam shaping can be accomplished with a sequence of phase correcting reflectors or lenses. (Rock et al., "A Power-Optimizing Integrated Design of a Dual-Frequency Gyrotron Quasi-Optical Mode Converter," IEEE Trans. Plasma Sci., 40(6), 1522-1529 (2012)). Large sizes can be sintered in this configuration, with the transverse dimensions limited only by the available microwave power.

For sintering of complex shapes, an appropriate free-space field distribution is more difficult to determine and obtain. In this situation, a cavity field applicator is preferred. The cavity should be designed so that the loaded structure supports a mode distribution with an approximately uniform field distribution throughout the specimen volume and that this distribution is excited by the microwave source. For highly oversized cavities it is generally possible to support such a mode distribution, though specialized techniques must be used to ensure its excitation. This includes considerations of symmetry, utilization of mode suppression structures, placement of dielectric materials (e.g., anti-reflective coatings) around the specimen, and optimizing dimensions of the cavity to select preferred modes.

Impact of Defect Crystal Structure on Mechanical Properties of Microwave Sintered Ceramic A dislocation is a linear or one-dimensional defect in a crystal around which some of the atoms are misaligned. Dislocations are of three types: edge (see FIG. 1A), screw (see FIG. 1B), and mixed (see FIG. 2). (Callister, John Wiley & Sons, Inc. (2004)). Edge dislocations are formed perpendicular to the direction of the shear stress applied to create them while screw dislocations are formed parallel to the applied shear stress direction. Mixed dislocations as the name suggests are dislocations that have both edge and screw components. (Callister, John Wiley & Sons, Inc. (2004) and Reed Hill et al., PWS Publishing (1994)). A crack that encounters a screw dislocation will generate a step in the new surface that is created by the crack. Multiple screw dislocations near each other can create larger steps. (Callister, John Wiley & Sons, Inc. (2004)). The fracture mode of spinel sintered using high frequency microwaves (e.g. 83 GHz) is characterized by the type of steps associated with screw dislocation/crack interaction (see FIG. 3). Such a fracture mode has not been observed in spinel processed using traditional sintering techniques (see FIG. 4). It has also not been observed via low frequency microwave sintering. (Reed Hill et al., PWS Publishing (1994)).

Dislocations are generally formed as a result of shear stresses such as those that occur during sintering or the application of steep thermal profiles. Large stresses are generated during rapid densification because of the fast microstructural rearrangements that are needed to sustain quick densification. In traditional processing, long time at elevated temperature allows for significant atomic re-ordering and the annihilation of dislocations. Likewise, the application of pressure at elevated temperature leads to annihilation of dislocations. (Callister, John Wiley & Sons, Inc. (2004) and Reed Hill et al., PWS Publishing (1994)).

In crystalline metals, it has been established that intergranular fracture (fracture between the grains, along the grain boundaries) is generally a result of weak grain boundaries in a material leading to reduced mechanical strength properties. Grain boundaries are often weakened by secondary phases and pores that migrate to grain boundaries and disrupt the intergranular bonding. In addition, these defects also act as crack initiation (stress amplification concentration) sites which cause fracture to begin at lower applied stress. (Kirman, Metall. Trans., 2, 1761 (1971); Banerji et al., Metall. Trans. A. 9A, 237 (1978); and Chen et al., Corros. Sci., 34, 2071 (1993)). On the contrary, high strength materials generally break through the grains (transgranular fracture). High strength, transgranular fracture is the result of consecutive and recurrent breaking of atomic bonds within a crystalline material along specific crystallographic directions. Strength, therefore, is limited by the bond strength of the most weakly bound crystallographic direction. These bonds are considerably stronger than those along a weak grain boundary. (Kirman, Metall. Trans., 2, 1761 (1971); Banerji et al., Metall. Trans. A. 9A, 237 (1978); and Chen et al., Corros. Sci., 34, 2071 (1993)).

The two main factors limiting the strength of traditional spinel are due to the trapped porosity at grain boundaries and the presence of secondary phases at the grain boundaries. Both factors are directly attributed to thermal gradients created within the material during processing that result in non-uniform densification. Temperature gradients across the material cause the parts of the material closest to the heat source (generally the outer surfaces) to densify at a faster rate than in the bulk. This leads to trapped pores within the bulk of the material. In the same way, reactions between sintering aids and impurities can result in both volatile and non-volatile species at elevated temperatures which are unable to escape through the densified outer surfaces. As the material cools, the volatile species precipitate within the material where both the precipitated material and the non-volatile reaction products migrate to grain boundaries resulting in the presence of secondary phases at the grain boundaries. These defects weaken the grain boundaries and promote intergranular fracture (along the grain boundaries) rather than transgranular fracture (through the grains). The intergranular mode of fracture, produced using traditional methods, limits the mechanical properties of polycrystalline spinel to values much less than theoretical values. (Rozenburg et al., J. Am. Ceram. Soc., 91, 444 (2008) and Mroz et al., Int. J. Appl. Ceram. Tec., 9, 83 (2011)).

In fracture mechanics, higher mechanical strength properties are linked to resistance to crack initiation and propagation. Once a crack is initiated, its energy is dissipated as it propagates through the material along the path with the lowest local energy needed to create new surfaces. Therefore, the more tortuous the path, the more surface area that must be created per net displacement, and the more energy required for the crack to reach termination. The presence of dislocations within a material has been shown to create stress fields in the material that can cause cracks to change direction creating a more tortuous path to termination. (Reed Hill et al., PWS Publishing (1994) and Evans, J. Am. Ceram. Soc., 73, 187 (1990)).

BRIEF SUMMARY OF THE INVENTION

The aforementioned problems are overcome in the present invention which provides an engineered high strength, small grain size ceramics having a transgranular fracture mode that can greatly improve mechanical properties and reduce production cost while maintaining full transparency from ultraviolet to mid-wave infrared. Use of microwave technology drastically reduces costs associated with energy and labor due to shortened processing times and greater efficiency. This enables direct replacement of windows, domes, and transparent armor components in existing systems and enables the design of systems that benefit from greater or comparable mechanical properties and optical performance while reducing weight.

These and other features and advantages of the invention, as well as the invention itself, will become better understood by reference to the following detailed description, appended claims, and accompanying drawings.

DETAILED DESCRIPTION OF THE INVENTION

Figure 1A:
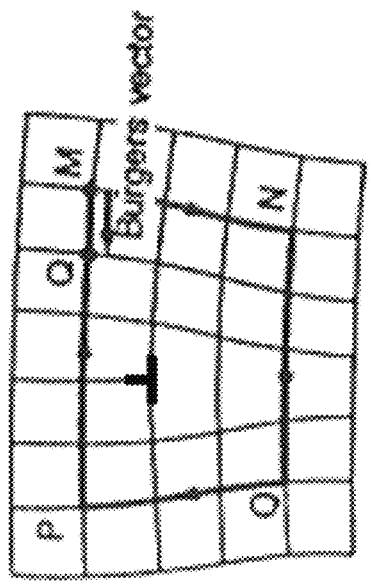
FIG. 1A is a diagram illustrating the difference between the atomic arrangements in a perfect crystal versus a crystal with an edge dislocation.
Figure 1A:
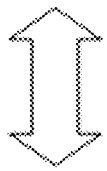
Figure 1A:
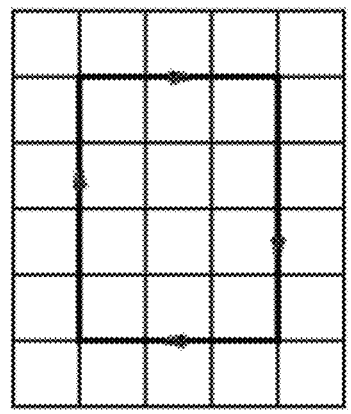
Figure 1B:
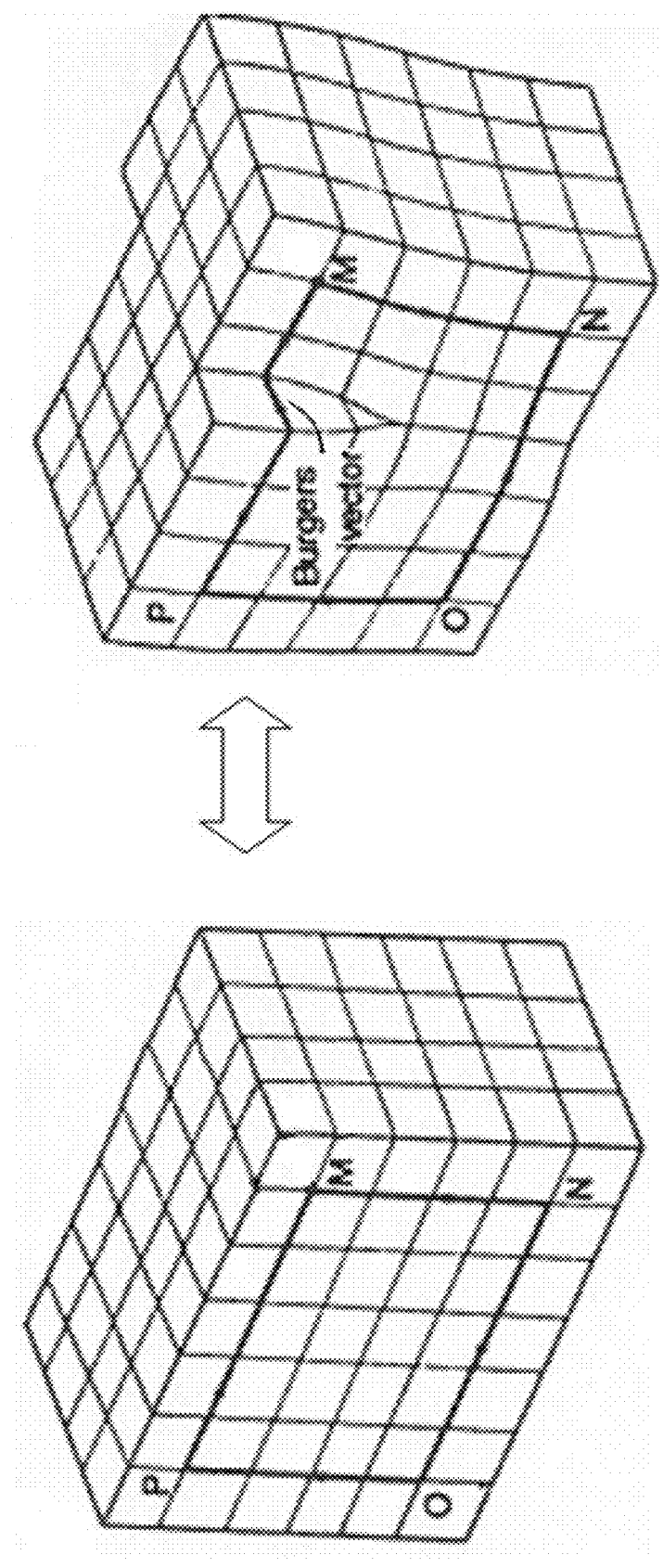
FIG. 1B is a diagram illustrating the difference between the atomic arrangement in a perfect crystal versus a crystal with a screw dislocation.
Figure 2:
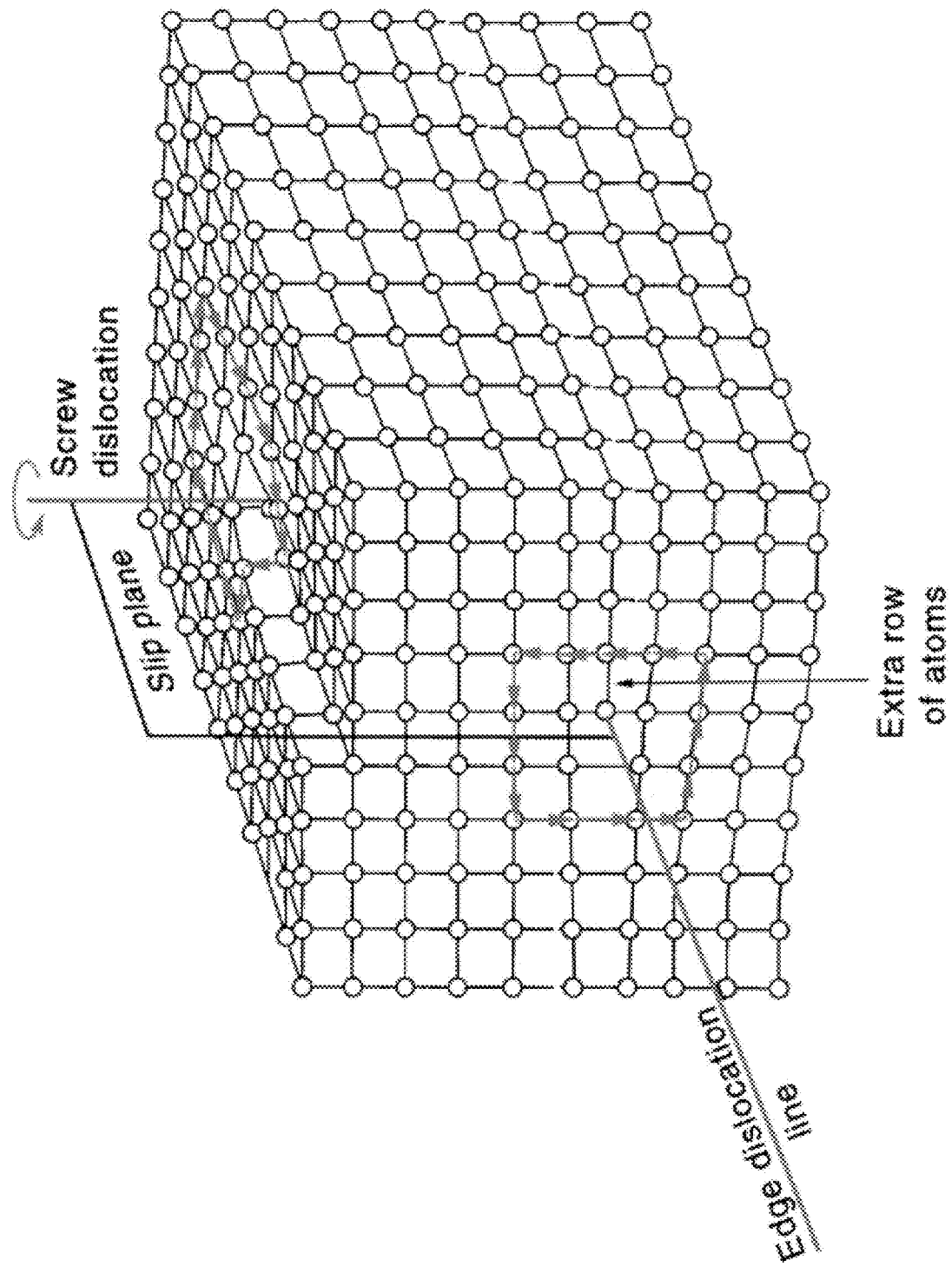
FIG. 2 is a diagram illustrating a mixed dislocation containing one edge and one screw component.
Figure 3:
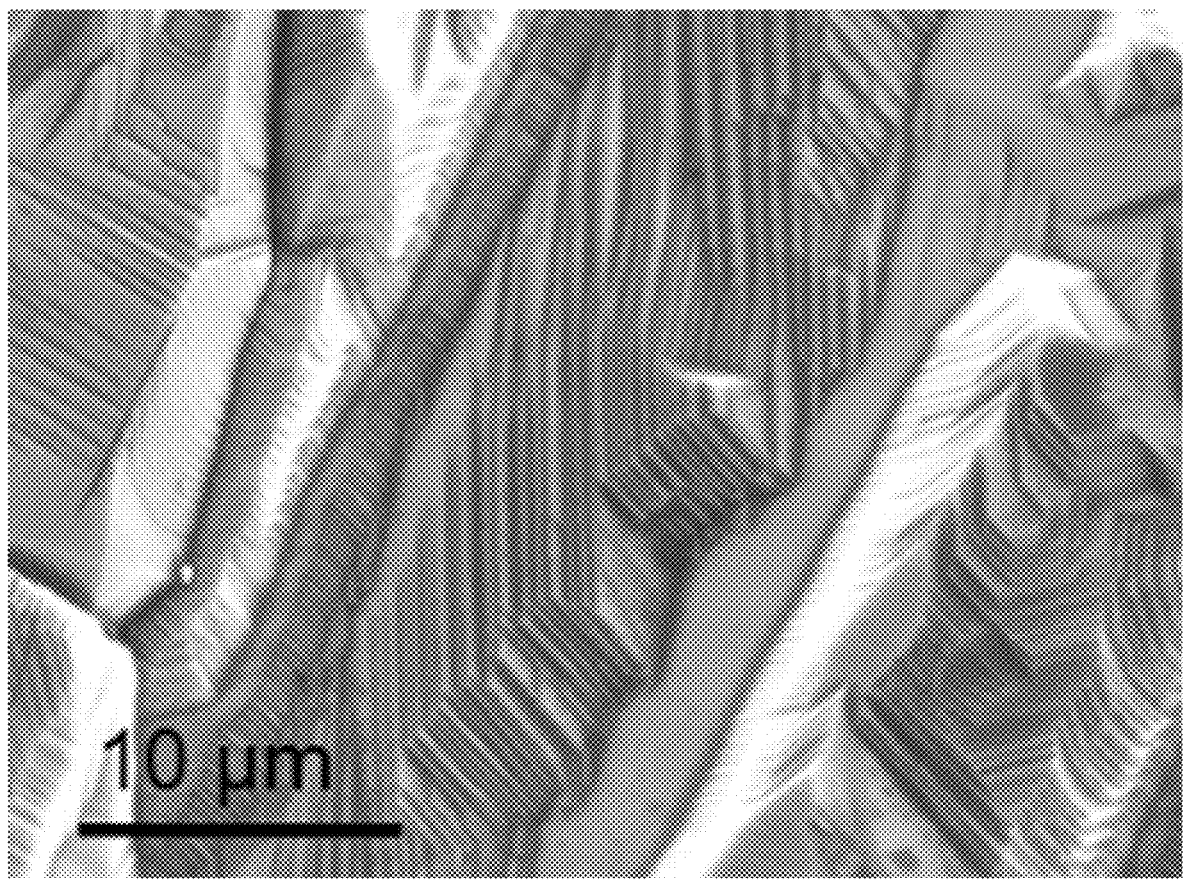
FIG. 3 is a scanning electron microscope image of the fracture surface of a spinel window sintered using 83 GHz microwave.
Figure 4:
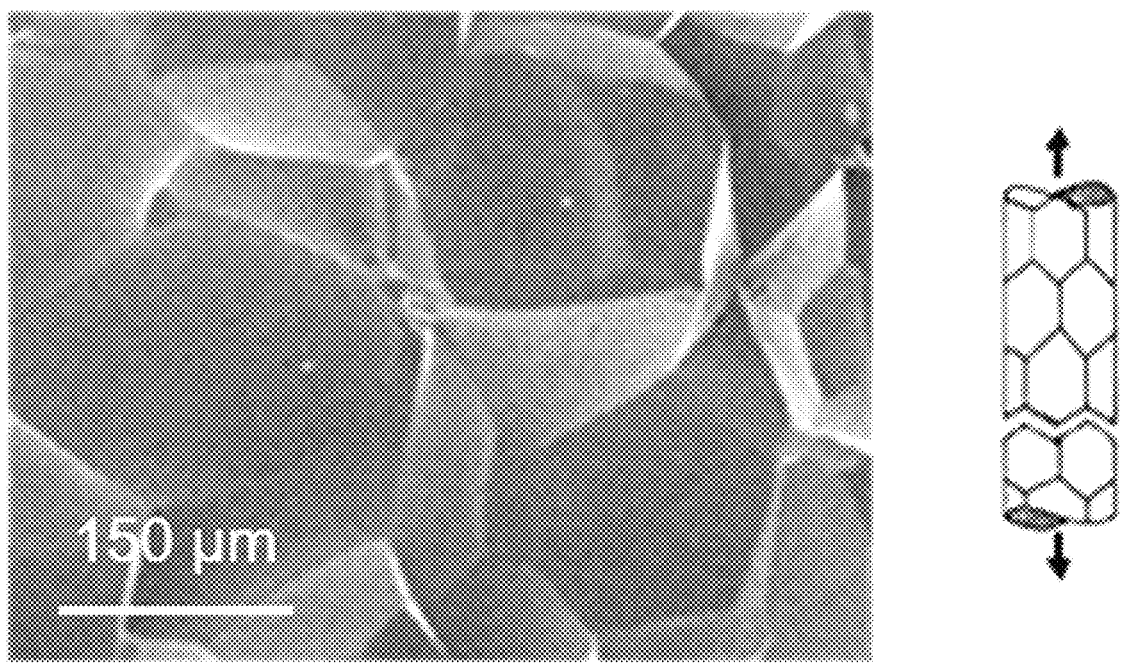
FIG. 4 is a scanning electron microscope image of the fracture surface of a spinel window sintered using conventional techniques.

As described herein, a high strength, transparent spinel ceramic with small grains and transgranular fracture behavior is created through rapid densification of a green body and subsequent cooling of the densified ceramic. The ceramic may include dislocations, defects, dopants, and/or secondary phases that are formed as a direct result of the described process and resulting in stress fields capable of redirecting or arresting cracks within the material.

The green body may be of any size and/or shape. The green body may be comprised of powder and material necessary to maintain its shape prior to densification. Here particles are defined as the individual masses of matter that make up a powder. These masses may be single crystals or polycrystalline. A grain is defined here as an individual single crystal contained within a polycrystalline material. A polycrystalline material is by definition made up of multiple grains that are bonded or fused together. The green body may be formed by any traditional ceramic forming method or derivative thereof that may be conceived by a person of ordinary skill in the art. In the embodiments, green bodies were formed using a combination of uniaxial and cold isostatic pressing. Green bodies may be formed using any ceramic powder with particle size less than 5 µm. The powder may be of any morphology and should have a surface area greater than 5 $m^2/g$.

A preferred embodiment includes the use of volumetric heating by interaction of the ceramic with microwaves to facilitate rapid densification uniformly throughout the material without the use of a susceptor or indirect heating. The frequency of the microwave should be sufficient to ensure uniform heating of the ceramic from room temperature to the maximum sintering temperature. The power of the microwave source should be adequate to ensure the necessary heat transfer to the ceramic. Microwaves would be made to interact with the material through the use of a microwave beam with or without beam optics and/or a cavity designed to provide the appropriate thermal profile for the required sample size and geometry. In embodiments, the materials were processed using a single fixed frequency 83 GHz microwave beam with a maximum power of 15 kW without the use of a designed cavity or specialized beam pattern.

Contemplated herein are processes for making high strength, small grain ceramics with transgranular fracture in large sizes and/or complex shapes. Ceramic material may be opaque or transparent. The microwave frequency must be greater than 30 GHz where the distance between node and anti-node will be a few mm or less. The microwave setup may include multiple sources. The microwave sources do not need to be of the same frequency and/or power. They also do not need to be of fixed frequency and/or power. For example, a green body with a curved shape can be heated using a single fixed 100 GHz source positioned at the top and three 60-90 GHz variable frequency sources positioned around the green body. The sources may be independently or collectively controlled.

The type of fracture mode and mechanical properties can be tailored to optimize the ceramic by changing the heating/cooling rates, maximum temperature, and time at temperature. The grain morphology and size can be modified based on particle size, powder morphology, and microwave frequency. The microwave frequency dictates the spacing between hot and cold nodes in the material which dictates the degree of uniformity within the densified ceramic as well as manipulating grain growth directions.

The various embodiments disclosed herein may be combined as evident to a person of ordinary skill in the art.

Example 1

Spinel powder with a grain size of 200 nm and a 30 $m^2/g$ surface area is uniaxially pressed into a 12 mm cylinder with 4 mm thickness then cold isostatically pressed (pressure is applied to a fluid and the fluid creates pressure on all of the material's geometric exterior surfaces) as a means to consolidate the powders into a green body shape with a density of greater than 50%. The green body is then heated to 600° C. for 6 hours in air to remove any organic matter from the green body.

Example 2

Spinel powder from Example 1 is slip cast (powder is suspended in a fluid then poured into a porous mold that removes the liquid and leaves behind consolidated particles in the shape of the mold) into an 8" dome shape and cold isostatically pressed to a green density of greater than 50%. Organics are removed similar to Example 1.

Example 3

Similar to Example 2, spinel powder from Example 1 is slip cast into a 1 m×1 m×0.025 m window and cold isostatically pressed to a green density of greater than 50%. Organics are removed similar to Example 1.

Example 4

Spinel powder from Example 1 is tape cast (powder is suspended in a viscous fluid and then shaped into thin sheets or tapes using a blade with a fixed height that the suspended powder must pass under) into a 130 mm wide×50 µm thick sheet with a green density greater than 40%. Organics are removed similar to Example 1.

Example 5

The green bodies from Examples 1-4 are densified to >95% of theoretical density using a 6 kW, 83 GHz microwave beam shaped to evenly heat their geometry at a rate of 100° C./min to 1450° C. and held there for about 15 minutes causing the formation of dislocations within the ceramic. The ceramic is then air cooled to room temperature to trap dislocations into the crystal structure.

Example 6

The green bodies from Examples 1-4 are densified using a cavity designed to produce uniform heating throughout the green body geometry using an 83 GHz microwave source based on the schedule in Example 5.

Example 7

Figure 5:
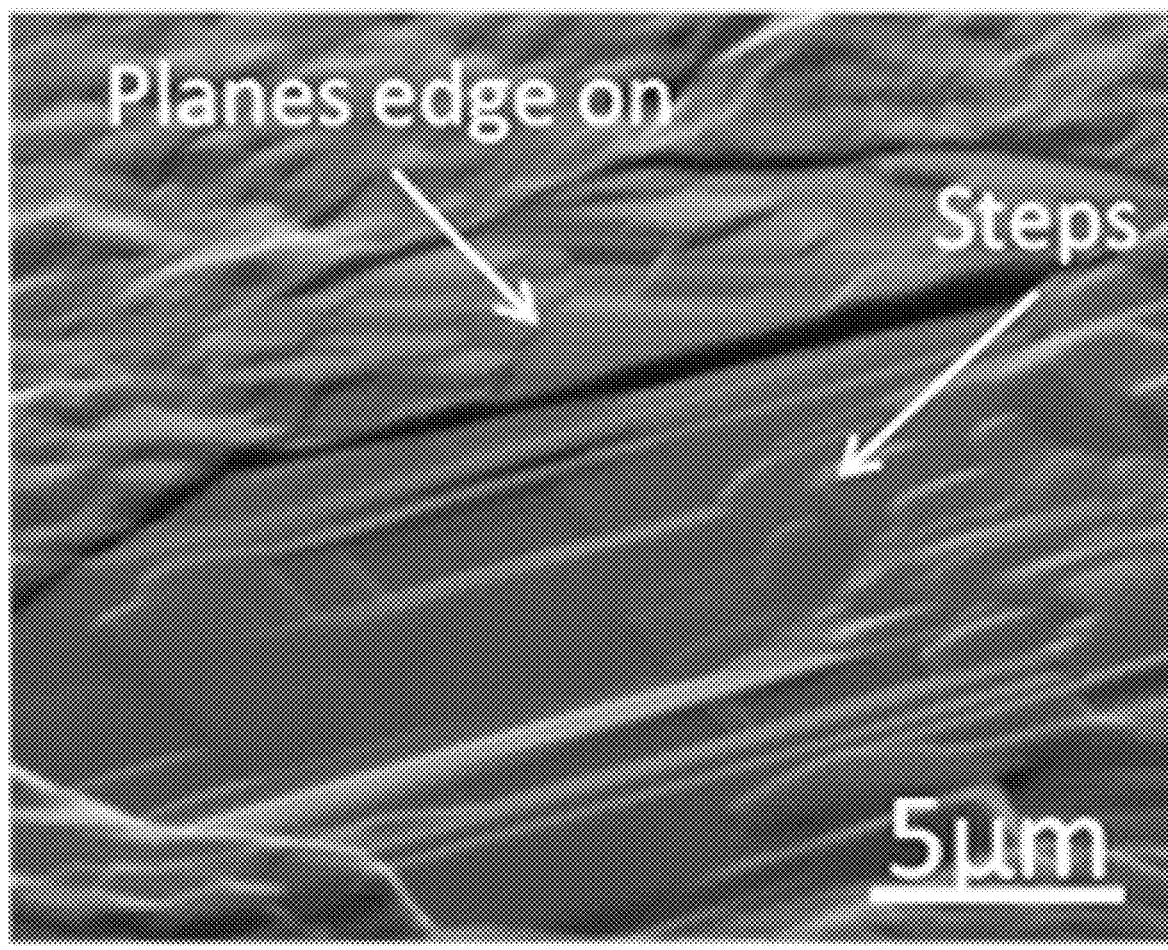
FIG. 5 is a scanning electron microscope image of demonstrated small grain size spinel window with novel fracture.

Spinel powder as in example 1 is intentionally doped with calcium prior to green body formation as in Examples 1-4. The resulting green body is processed similar to Examples 4 and 5. The rapid diffusion of the calcium dopant within the ceramic disrupts the normal spinel structure by creating stress fields, dislocations, and defects within the crystal lattice to steer cracks as they pass through the grains during fracture (see FIG. 5).

Example 8

The same procedures as in Examples 1-7 but using barium titanate. The green bodies are densified at 1100° C. for 15 minutes to obtain a high strength, small grain ceramic (15 µm or less) with transgranular fracture mode. Traditional processes typically yield grain sizes of 20 µm and larger indicating the transgranular fracture mode dominates the strength behavior of the material.

Example 9

The same procedures as in Examples 1-7 but using Lutetium oxide. The green bodies are densified at 1500° C. for 15 minutes to obtain a high strength, small grain ceramic with transgranular fracture mode.

Example 10

The same procedures as in Examples 1-7 but using Yttrium oxide. The green bodies are densified at 1100° C. for 15 minutes to obtain a high strength, small grain ceramic with transgranular fracture mode.

Example 11

Similar to Examples 8-10, this method is applicable to other doped and undoped ceramics where higher mechanical strength is needed. Other microwave frequencies greater than 30 GHz may be used to tailor the coupling of microwaves to the ceramic green body.

Example 12

The ceramics made using this process exhibit strengths that are more than 5 times higher than glass. This higher strength is attributed to the novel transgranular fracture mechanism observed in spinel made using high frequency microwaves.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method for making a ceramic having transgranular fracture behavior, comprising: forming a green body comprising lutetium oxide powder; densifying the green body using microwaves to heat the green body at a rate of 100° C./min to 1500° C. and then holding at 1500° C. for 15 minutes, wherein the microwave frequency is greater than 30 GHz, wherein a ceramic is formed, and wherein there are dislocations within the ceramic; and cooling the ceramic to room temperature to trap the dislocations in the ceramic, resulting in a ceramic having a transgranular fracture mode.

2. The method of claim 1, wherein said green body is formed by cold isostatic pressure, slip casting, tape casting, or any combination thereof.

3. The method of claim 1, wherein said green body is densified using a cavity designed to produce uniform heating throughout said green body.

4. The method of claim 1, wherein the microwaves are used without the use of a susceptor or indirect heating.

5. The method of claim 1, wherein said ceramic powder is doped with calcium prior to green body formation.

\* \* \* \* \*